3,564,099
ANIMAL FEED COMPOSITIONS AND METHODS
Gino J. Marco, Webster Groves, and Ernest G. Jaworski, Olivette, Mo., assignors to Monsanto Company, St. Louis, Mo., a corporation of Delaware
No Drawing. Filed May 29, 1967, Ser. No. 642,139
Int. Cl. A61k 27/00
U.S. Cl. 424—320                    17 Claims

ABSTRACT OF THE DISCLOSURE

Animal feed compositions containing α-haloacetamides elicit substantially greater weight gain and feed efficiency response in animals than said diets used alone due to the growth promoting properties of the said α-haloacetamides.

---

This invention relates to animal feed compositions and to methods of improving growth response in animals.

In accordance with the present invention, it has now been found that certain α-haloacetamides are useful growth promoters for animals. Animal diets containing the α-haloacetamides elicit a substantially greater weight gain and feed efficiency response in animals than when said diets are used alone. This increase in weight gain and feed efficiency is wholly unexpected in view of that disclosed heretofore.

The improved weight gain and feed efficiency response in animals is accomplished in accordance with this invention by a method which comprises orally administering to the animal a growth-promoting amount of at least one α-haloacetamide of the formula

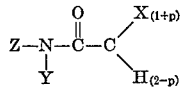

wherein

X is halogen (Cl, Br, F and I); $p$ is an integer from 0 to 2 inclusive;

Z is selected from the group consisting of
  (I) hydrogen,
  (II) $X_n^1R$— wherein R is hydrocarbyl of not more than 18 carbon atoms selected from the group consisting of alkyl, alkenyl and alkynyl, $X^1$ is halogen (Cl, Br, F and I), hydroxyl or amino and $n$ is an integer from 0 to 3 inclusive,
  (III) cycloalkyl, alkylcycloalkyl and alkoxycycloalkyl of at least 5 and not more than 8 ring carbon atoms and not more than 12 chain carbon atoms, and
  (IV) $R^3O\text{+}R^2O\text{+}_aR^1$— wherein $R^1$ is selected from the group consisting of alkylene and alkoxyalkylene of not more than 8 carbon atoms, $R^2$ is alkylene of not more than 4 carbon atoms, $R^3$ is selected from the group consisting of alkyl and alkenyl of not more than 4 carbon atoms and $m$ is an integer from 0 to 1; and Y is selected from the group consisting of
  (V) hydrogen,
  (VI) $X_m^2R^4$— wherein $R^4$ is hydrocarbyl of not more than 18 carbon atoms selected from the group consisting of alkyl, alkenyl and alkynyl, $X^2$ is halogen (Cl, Br, F and I), hydroxyl or amino and $m$ is an integer from 0 to 3 inclusive,
  (VII) $R^7O\text{+}R^6O\text{+}_bR^5$— wherein $R^5$ is selected from the group consisting of alkylene and alkoxyalkylene of not more than 8 carbon atoms, $R^6$ is alkylene of not more than 4 carbon atoms, $R^7$ is selected from the group consisting of alkyl and alkenyl of not more than 4 carbon atoms and $b$ is an integer from 0 to 1, and
  (VIII) cycloalkenyl, alkylcycloalkenyl and alkoxycycloalkenyl of at least 5 and not more than 8 ring carbon atoms, and not more than 12 chain carbon atoms.

The compounds of the above formula are useful in animal feeds generally, for example, poultry, swine and ruminant feeds, but they are particularly advantageous when employed in ruminant feeds for cattle and sheep.

In the above formula the $X_n^1R$— and $X_m^2R^4$— of Z and Y can be alkyl such as methyl, ethyl, n-propyl, isopropyl, n-butyl, sec-butyl, isobutyl, tert-butyl, amyl, hexyl, heptyl, octyl, nonyl, decyl, undecyl, dodecyl, octadecyl and the various homologues and isomers of alkyl of not more than 18 carbon atoms, haloalkyl such as chloromethyl, iodomethyl, bromomethyl, fluoromethyl, trichloromethyl, chloroethyl, iodoethyl, trifluoromethyl, bromomethyl, difluoromethyl, dichloromethyl, diiodoethyl, dibromoethyl, fluoroethyl, dichloroethyl, chloro-n-propyl, bromo-n-propyl, iodoisopropyl, bromo-n-butyl, bromo-tert-butyl, 1,3,3-trichlorobutyl, 1,3,3-trifluorobutyl, 1,3,3 - tribromobutyl, 1,3,3-trichlorooctyl and the halogenated straight and branched chain alkyl of not more than 18 carbon atoms, hydroxyalkyl such as hydroxymethyl, hydroxyethyl, hydroxypropyl, hydroxybutyl, hydroxypentyl, hydroxyoctyl, 2,4-dihydroxy butyl, 1,3-dihydroxypropyl and the various homologues and isomers of hydroxyalkyl of not more than 18 carbon atoms; aminoalkyl such as aminomethyl, 2,4-diaminobutyl, aminoethyl, 2,6-diaminooctyl, aminopropyl, aminoheptyl, aminobutyl and the various homologues and isomers of aminoalkyl of not more than 18 carbon atoms; alkenyl such as vinyl, allyl, n-butenyl-1, n-butenyl-2, n-pentenyl-2, 2,3-dimethyl-1-pentenyl, n-hexenyl-2, 2,3-dimethylbutenyl-2, n - heptenyl, n - decenyl, n - dodecenyl and the various homologues and isomers of alkenyl of not more than 18 carbon atoms, haloalkenyl such as chlorovinyl, bromovinyl, chloroallyl, bromoallyl, 3-chloro-n-butenyl-1, 3-chloro - n - pentenyl - 1, 4-chloro-n-hexenyl-2, 3,4-di-(chloromethyl)pentenyl - 1, 3 - fluoro - n - heptenyl-1, 1,3,3 - trichloro - n - heptenyl - 5, 1,3,5 - trichloro-n-octenyl - 6, 2,3,3-tri-(chloromethyl)pentenyl-4 and the various homologues and isomers of haloalkenyl of not more than 18 carbon atoms, alkynyl such as propargyl, butynyl, pentynyl, octynyl and the various homologues and isomers of alkynyl of not more than 18 carbon atoms, haloalkynyl such as chloropropargyl, bromopropargyl, iodopropargyl and fluoropropargyl, chlorobutynyl, bromobutynyl, chloropentynyl, iodopentynyl and the like, and aminoalkynyl such as aminopropynyl, aminobutynyl and aminopentynyl and the like.

The cycloalkyl and substituted-cycloalkyl of Z can be for example cyclopentyl, 3-methylcyclopentyl, 5-methylcyclopentyl, 3,4 - dimethylcyclopentyl, 2,5 - dimethoxycyclopentyl, 2 - methylcyclopentyl, 3,4 - dimethylcyclopentyl, 5-(tert-butyl)cyclopentyl, cyclohexyl, 3-methylcyclohexyl, 3,4-dimethylcyclohexyl, 6-methoxycyclohexyl, 2,4 - dimethylcyclohexyl, 2 - methylcyclohexyl, 3,4-dimethylcyclohexyl, 2,6-diethoxycyclohexyl, 3,3-dimethylcyclohexyl, 6 - (tert-butyl)cyclohexyl, cycloheptyl, 3-methylcycloheptyl, 3,4 - dimethylcycloheptyl, 7-methylcycloheptyl, 4,5 - dimethylcycloheptyl, 2 - butoxycycloheptyl, 6-methylcycloheptyl, 7-methylcycloheptyl, 7-(tert-butyl)cycloheptyl, 3,4-diisopropylcycloheptyl, cyclooctyl, 3,4-dimethylcyclooctyl, and the like.

The term "cycloalkenyl" as used herein and in the appended claims is inclusive of cyclohexadienyl wherein one unsaturation is at the ring carbon atom through which the cyclohexadienyl ring is bonded to the nitrogen atom, i.e., the 1 or 6 position, as well as the mono-unsaturated cycloalkenyl.

Y as cycloalkenyl and substituted-cycloalkenyl can be for example 1-cyclopentenyl,
2-cyclopentenyl,
3-methyl-1-cyclopentenyl,
5-methyl-2-cyclopentenyl,
3,4-dimethyl-1-cyclopentenyl,
2,5-dimethyl-1-cyclopentenyl,
5-methyl-5-cyclopentenyl,
3,4-dimethyl-2-cyclopentenyl,
5-(tert-butyl)-1-cyclopentenyl
1-cyclohexenyl,
2-cyclohexenyl,
3-methyl-1-cyclohexenyl,
3,4-dimethyl-1-cyclohexenyl,
6-methyl-2-cyclohexenyl,
2,4-dimethyl-1-cyclohexenyl,
3-methyl-6-cyclohexenyl,
3,4-dimethyl-6-cyclohexenyl,
2,6-dimethyl-2-cyclohexenyl,
3,3-dimethyl-1-cyclohexenyl,
6-(tert-butyl)-1-cyclohexenyl,
1,3-cyclohexadienyl,
3-methyl-1,3-cyclohexadienyl,
3,4-dimethyl-1,3-cyclohexadienyl,
6-methyl-1,3-cyclohexadienyl,
2,4-dimethyl-1,3-cyclohexadienyl,
3-methyl-4,6-cyclohexadienyl,
3,4-dimethyl-4,6-cyclohexadienyl,
2,6-dimethyl-4,6-cyclohexadienyl,
5,5-dimethyl-1,3-cyclohexadienyl,
6-(tert-butyl)-1,3-cyclohexadienyl,
3,5,5-trimethyl-1,3-cyclohexadienyl,
1,4-cyclohexadienyl,
3-methyl-1,4-cyclohexadienyl,
3,4-dimethyl-1,4-cyclohexadienyl,
6-methyl-1,4-cyclohexadienyl,
2,4-dimethyl-1,4-cyclohexadienyl,
2,6-dimethyl-1,4-cyclohexadienyl,
2,5-dimethyl-1,4-cyclohexadienyl,
6-(tert-butyl)-1,4-cyclohexadienyl,
3,6,6-trimethyl-1,4-cyclohexadienyl,
3-methyl-3,6-cyclohexadienyl,
6-methyl-3,6-cyclohexadienyl,
2,6-dimethyl-3,6-cyclohexadienyl,
2,5,5-trimethyl-3,6-cyclohexadienyl,
3,5,5-trimethyl-3,6-cyclohexadienyl,
2,4-dimethyl-3,6-cyclohexadienyl,
6-(tert-butyl)-3,6-cyclohexadienyl,
1,5-cyclohexadienyl,
3-methyl-1,5-cyclohexadienyl,
3,4-dimethyl-1,5-cyclohexadienyl,
6-isopropyl-1,5-cyclohexadienyl,
6-tert-butyl-1,5-cyclohexadienyl,
2,6-dimethyl-1,5-cyclohexadienyl,
3-methyl-2,6-cyclohexadienyl,
2,5,5-trimethyl-2,6-cyclohexadienyl,
3,5,5-trimethyl-2,6-cyclohexadienyl,
6-(tert-butyl)-2,6-cyclohexadienyl,
6-methyl-2,6-cyclohexadienyl,
1-cycloheptenyl,
3-methyl-2-cycloheptenyl,
3,4-dimethyl-3-cycloheptenyl,
7-methyl-1-cycloheptenyl,
4,5-dimethyl-3-cycloheptenyl,
2-methyl-1-cycloheptenyl,
6-methyl-2-cycloheptenyl,
7-methyl-2-cycloheptenyl,
7-(tert-butyl)-1-cycloheptenyl,
3,4-diisopropyl-1-cycloheptenyl,
1-cyclooctenyl,
3,4-dimethyl-3-cyclooctenyl,
3-methoxy-1-cyclopentenyl
5-methoxy-2-cyclopentenyl,
3,4-dimethoxy-5-cyclopentenyl,
5-(tert-butoxy)-1-cyclopentenyl,
3-methyl-3-cyclohexenyl,
3-methoxy-1-cyclohexenyl,
2,4-dimethoxy-1-cyclohexenyl,
6-(tert-butoxy)-2-cyclohexenyl,
3-methoxy-1,3-cyclohexadienyl,
6-methoxy-1,3-cyclohexadienyl,
3-methoxy-4,6-cyclohexadienyl,
5,5-diethoxy-1,3-cyclohexadienyl,
6-(tert-butoxy)-1,3-cyclohexadienyl,
3,5,5-trimethoxy-1,3-cyclohexadienyl,
cyclohexadienyl,
6-methoxy-1,4-cyclohexadienyl,
2,4-dimethoxy-1,4-cyclohexadienyl,
2-methoxy-6-methyl-1,4-cyclohexadienyl,
6-(tert-butoxy)-1,4-cyclohexadienyl,
6-methoxy-3,6-cyclohexadienyl,
3,5,5-trimethoxy-3,6-cyclohexadienyl,
3,4-dimethoxy-1,5-cyclohexadienyl,
2,6-dimethoxy-1,5-cyclohexadienyl,
2,5,5-trimethoxy-2,6-cyclohexadienyl,
3,4-dimethoxy-1-cycloheptenyl,
4,5-dimethoxy-1-cycloheptenyl,
7-methoxy-7-cycloheptenyl,
7-(tert-butoxy)-1-cycloheptenyl,
3-methoxy-1-cyclooctenyl,
4-methoxy-3-cyclooctenyl and the like.

The $R^3O$ $\{R^2O\}_aR^1$— and $R^7O$ $\{R^6O\}_bR^5$ of Z and Y can be alkoxyalkyl, alkenoxyalkyl, alkoxyalkoxyalkyl, alkenoxyalkoxyalkyl, dialkoxyalkyl, alkenoxy(alkoxy)-alkyl, alkenoxyalkoxy(alkoxy)alkyl and alkoxyalkoxy(alkoxy)alkyl such as methoxyethyl, 2-ethoxyethyl, 3-propoxypropyl, 4-methoxybutyl, 4-butoxybutyl, 2-allyloxyethyl, 2-butenoxyethyl, 4-butenoxybutyl, 2-(2-methoxyethoxy)ethyl, 2-(2-butoxyethoxy)ethyl, 4 - (3-methoxypropoxy)butyl, 2-(3-allyloxypropoxy)ethyl, 2-(2-butenoxyethoxy)ethyl, 4,4-dimethoxybutyl, 2,2-diethoxyethyl, 2,4-dimethoxybutyl, 4,4-diethoxybutyl, 2-methoxy-4-allyloxybutyl, 2-ethoxy-2-propenoxyethyl, 4-(2-allyloxyethoxy)-2-methoxybutyl, 2-(4-methoxybutoxy) - 2 - methoxyethyl, 4-(2-methoxyethoxy) - 4 - butoxybutyl and the like.

The compounds of the above formula can be prepared by processes described in detail in U.S. Pats. 2,864,683, 3,268,324 and 3,007,786, and copending applications Ser. No. 523,870, filed Feb. 1, 1966, and Ser. No. 323,912, filed Nov. 15 1963. In general, the compounds are prepared by reacting the appropriate amine with a haloacetyl halide.

The reaction of the haloacetyl halides with amines can be carried out in various ways. Normally it is desired for maximum yield that the amine be present in at least an equimolar amount to the haloacetyl halide and preferably in excess of equimolar amount. The reaction is suitably carried out at room temperature, i.e. about 20–25° C. However, higher or lower temperatures can be used, the temperature not being critical. For example, temperatures above about 40° C. are generally employed when no acid acceptor is used.

The reaction is preferably carried out in the presence of an acid acceptor and an inert organic medium. The acid acceptor is generally present in at least equimolar amounts based on the amount of hydrogen halide formed in the reaction. Suitable acid acceptors, e.g. alkaline-acting or basic materials capable of binding the acid evolved in the reaction are the tertiary amines such as trimethylamine, triethylamine, pyridine, quarternary ammonium hydroxides, N-ethylmorpholine and the like; inorganic bases such as sodium hydroxide and potassium hydroxide, sodium carbonate and the like. An excess of amine reactant also serves as an acid acceptor.

Inert organic media which can be used include by way of example hydrocarbons such as benzene, toluene, xylene, cyclohexane, methylcyclohexane, n-heptane, n-hexane and the like; ethers such as isopropyl ether, n-btuyl ether, 1,4-dioxane, isobutyl ether, diethyl ether and the like; aliphatic and cycloaliphatic ketones such as methyl isopropyl ketone, methyl isobutyl ketone, methyl isoamyl ketone, diisopropyl ketone, cyclohexanone and the like; and organic halides such as carbon tetrachloride, n-butyl chloride, ethylene dichloride, tetrachloroethylene and the like.

The separation of the resulting reaction product from the reaction mixture is readily accomplished. For example the salt, such as a tertiary amine hydrochloride salt formed during the reaction because of the presence of a tertiary amine compound therein as an acid acceptor, is separated from the product containing reaction mixture by simple means such as filtration and the solvent is removed from the resulting filtrate by stripping or distillation, preferably low temperature vacuum distillation. The product can be purified by any of the conventional means well known in the art, e.g. fractional distillation under reduced pressure, selective extraction, fractional distillation using a carrier gas or any suitable combination of these. If desired the product can be subjected to film distillation, recrystallization or a combination of both for further purification.

The value of animal feeds generally has been determined directly by feeding the animal. Within the past few years, however, the in vitro rumen technique whereby the changes occurring in feeds brought about by microorganisms are measured more readily and with great accuracy has been employed more frequently in the evaluation of animal feeds. This technique involves the use of an apparatus in which the digestive processes of the animals are conducted and studied in vitro. The animal feeds, rumen inoculum and various growth promotants are introduced into and withdrawn from a laboratory unit under carefully controlled conditions and the changes taking place are studied critically and progressively during the consumption of the feed by the microorganisms. The results obtained by use of the aforesaid transplanted rumen technique have been confirmed in vivo by actual feeding of animals.

Several parameters have been employed in the in vitro test methods to determine the effectiveness of the active growth promoting material. In the following examples the parameter employed in evaluating the α-haloacetamides is the change in propionic acid content in the rumen fluids. An increase in the propionic acid content of the rumen fluid indicates that a desirable response in overall ruminant performance has been brought about by the α-haloacetamides in the feed compositions. These in vitro observations have been confirmed by in vivo test methods in which rumen fluids are analyzed at the end of several days and by long-term in vivo feeding of ruminants over several months in which weight gain and feed efficiency are measured.

In the examples of the present invention which follow, evaluation of the α-haloacetamides is made (1) in vitro and (2) in vivo. The in vitro rumen fluids are analyzed by a gas chromatographic procedure to determine the change of propionic acid content therein. The change in propionic acid content is expressed as percent of the propionic acid content found in the control rumen fluid. In other examples long-term in vivo feeding studies are used to show a reliable correlation between propionic acid increase in the rumen fluid and improved animal performance.

The following examples in which parts and percent are expressed by weight unless otherwise indicated, further illustrate the advantages of this invention.

EXAMPLE 1

The in vitro experiments are fermentation reactions in which the conditions existing in the rumen are simulated. The test additive (534 mg.) is dissolved in 5 to 10 ml. of acetone or methylene chloride and mixed with 2 grams of a standard substrate (68% corn starch, 17% alphacellulose, and 15% soybean meal). The mixture is evaporated in a nitrogen atmosphere with constant stirring to provide a substrate coated with the test additive. This coated substrate (119 mg.) is mixed with 300 mg. of uncoated substrate and charged to 50 ml. Erlenmeyer flasks. Rumen fluid from a fasted sheep (7 to 8 hours) is taken, filtered through four layers of cheesecloth and 10 ml. of the fluid charged to each flask. A buffer solution of the following composition is prepared and adjusted to pH 6.8 with aqueous 4 N HCl.

Buffer solution in grams per liter

| | |
|---|---|
| $NaH_2PO_4$ | .316 |
| $KH_2PO_4$ | .152 |
| $NaHCO_3$ | 2.260 |
| KCl | .375 |
| NACl | .375 |
| $MgSO_4$ | .112 |
| $CaCl_2$ | .038 |
| $FeSO_4 \cdot 7H_2O$ | .008 |
| $MnSO_4$ | .004 |
| $ZnSO_4 \cdot 7H_2O$ | .004 |
| $CuSO_4 \cdot 5H_2O$ | .002 |
| $CoCl_2$ | .001 |

Ten milliliters of the buffer solution are added to each flask. The flasks are purged with nitrogen, stoppered with pressure release valves and heated at 39° C.±0.5° C. on a water shaker bath. The fermentation mixtures are incubated for 16 hours and then analyzed to determine the propionate response. Results are given below in Table I.

TABLE I

| Compound: | Propionate response, percent of control |
|---|---|
| Control | 100 |
| α-Chloroacetamide | 146 |
| α-Chloro-N-methylacetamide | 138 |
| α-chloro-N-hydroxymethylacetamide | 130 |
| α-Chloro-N-ethylacetamide | 160 |
| α-Chloro-N-allylacetamide | 138 |
| α-Chloro-N-methallylacetamide | 126 |
| α-Chloro-N-(2-chloroallyl)acetamide | 124 |
| α-Chloro-N-butylacetamide | 135 |
| α-Chloro-N-isobutylacetamide | 135 |
| α-Chloro-N-sec.butylacetamide | 138 |
| α-Chloro-N-tert.butylacetamide | 122 |
| α-Chloro-N-propylacetamide | 145 |
| α-Chloro-N-isopropylacetamide | 143 |
| α-Chloro-N-(3-methoxypropyl)acetamide | 131 |
| α-Chloro-N-pentylacetamide | 154 |
| α-Chloro-N-isopentylacetamide | 167 |
| α-Chloro-N-(n-hexyl)acetamide | 226 |
| α-Chloro-N-cyclohexylacetamide | 160 |
| α-Chloro-N-(3-ethoxypropyl)acetamide | 133 |
| α-Chloro-N-(n-heptyl)acetamide | 202 |
| α-Chloro-N-(n-octyl)acetamide | 237 |
| α-Chloro-N-tert.octylacetamide | 183 |
| α-Chloro-N-(2-ethylhexyl)acetamide | 243 |
| α-Chloro-N-(n-nonyl) acetamide | 238 |
| α-Chloro-N(2,6-dimethylcyclohexen-1-yl)-acetamide | 127 |
| α-Chloro-N-(n-decyl)acetamide | 205 |
| α-Chloro-N-undecylacetamide | 111 |
| α-Chloro-N-dodecylacetamide | 113 |
| α-Bromo-N-(dodecyl)acetamide | 192 |
| α-Chloro-N,N-dimethylacetamide | 108 |
| α-Chloro-N-methyl-N-ethylacetamide | 135 |
| α-Chloro-N,N-diethylacetamide | 126 |
| α-Chloro-N-ethyl-N(1-propenyl)acetamide | 153 |
| α-Chloro-N-ethyl-N-(3-n-butoxypropyl)-acetamide | 135 |
| α-Chloro-N-ethyl-N-cyclohexylacetamide | 139 |
| α-Chloro-N-ethyl-N-(n-octyl)acetamide | 152 |
| α-Chloro-N-ethyl-N-(n-decyl)acetamide | 184 |

TABLE I—Continued

| Compound: | Propionate response, percent of control |
|---|---|
| α-Chloro-N,N-dimethallylacetamide | 123 |
| α-Chloro-N,N-diallylacetamide | 126 |
| α-Chloro-N-allyl-N-isopropylacetamide | 127 |
| α-Chloro-N-allyl-N-sec.butylacetamide | 131 |
| α-Chloro-N-allyl-N-cyclohexylacetamide | 136 |
| α-Chloro-N-allyl-N[3-(5)methyl-1-cyclohexen-1-yl acetamide | 175 |
| α-Chloro-N,N-di-n-propylacetamide | 120 |
| α-Chloro-N-isopropyl-N(2 - propynyl)acetamide | 135 |
| α-Chloro-N-isopropyl-N-cyclohexylacetamide | 142 |
| α-Chloro-N-isopropyl-N-(3-cyclohexenyl)-acetamide | 147 |
| α-Chloro-N,N-di-isobutylacetamide | 128 |
| α-Chloro-N,N-di-sec.butylacetamide | 124 |
| α-Chloro-N-n-butyl-N-isopropylacetamide | 140 |
| α-Chloro-N-tert.butyl-N-isopropylacetamide | 149 |
| α-Chloro-N-tert.butyl-N-cyclohexylacetamide | 128 |
| α-Chloro-N-tert.butyl-N-(5,5,7,7-tetramethyl-2-octenyl)acetamide | 105 |
| α-Chloro-N-cyclohexyl-N-(2-methylpropenyl)-acetamide | 131 |
| α-Chloro-N,N-di(n-hexyl)acetamide | 134 |
| α-Chloro-N-cyclohexyl-N-(5,5,7,7-tetramethyl-2-octenyl)acetamide | 111 |
| α-Chloro-N-(2-methoxyethyl)-N-(2-methylcyclohexen-1-yl)acetamide | 128 |
| α-Chloro-N(2-methoxyethyl)-N(2-ethylcyclohexen-1-yl)acetamide | 180 |
| α-Chloro-N(2-methoxyethyl)-N(2-isopropylcyclohexen-1-yl)acetamide | 195 |
| α-Chloro-N(2-methoxyethyl)-N(2,6-dimethyl-1-cyclohexen-1-yl)acetamide | 154 |

A basal ration having approximately the following composition was used in Examples 2 and 3.

| Component: | Percent |
|---|---|
| Ground corn | 27.45 |
| Soybean meal (50%) | 18.90 |
| Defluorinated phosphate (18% P) | 0.81 |
| Iodized salt | 0.45 |
| Trace minerals | 0.09 |
| Ground corn cobs | 10.00 |
| Molasses | 8.10 |
| Chopped alfalfa hay | 34.20 |

Vitamin A 10 MIU/gm., 275 gms./ton.

EXAMPLE 2

A number of sheep feeding studies were carried out with the above basal ration and the various α-haloacetamides listed below in Table II. In each study one group of sheep was fed the basal ration without an α-haloacetamide additive to serve as control. The feed efficiency as determined from the average daily weight gain and average daily feed consumption for each group of sheep, self-fed, over a twenty-one day period is set forth in Table II.

TABLE II

| Compound | Concentration, percent | Feed efficiency | Percent of control |
|---|---|---|---|
| Control | | 6.9 | 100 |
| α-Chloro-N-cyclohexylacetamide | 0.005 | 6.0 | 115 |
| α-Chloro-N-cyclohexylacetamide | 0.0005 | 6.1 | 113 |
| α-Chloro-N-(n-decyl)acetamide | 0.005 | 4.5 | 153 |
| α-Chloro-N-(n-dodecyl)acetamide | 0.005 | 5.9 | 117 |
| α-Chloro-N-(3-ethoxypropyl)-N-ethylacetamide | 0.005 | 4.4 | 156 |
| α-Bromo-N-(n-dodecyl)acetamide | 0.005 | 6.0 | 115 |
| α-Bromo-N-(n-dodecyl)acetamide | 0.0005 | 6.5 | 106 |
| Control | | 8.7 | 100 |
| α-Chloro-N-(2-hydroxyethyl) acetamide | 0.005 | 6.6 | 132 |
| Control | | 7.6 | 100 |
| α-Chloro-N-methylacetamide | 0.0005 | 5.4 | 140 |
| α-Chloro-N-ethylacetamide | 0.0005 | 4.6 | 165 |
| α-Chloro-N-allylacetamide | 0.0005 | 7.2 | 105 |
| α-Chloro-N-hexylacetamide | 0.0005 | 6.1 | 125 |
| α-Chloro-N-2-ethylhexylacetamide | 0.005 | 6.7 | 113 |
| α-Chloro-N-tetradecylacetamide | 0.005 | 5.7 | 133 |
| α-Bromo-N-dodecylacetamide | 0.005 | 5.3 | 143 |
| Control | | 9.0 | 100 |
| α-Chloroacetamide | 0.005 | 7.3 | 123 |
| Control | | 6.2 | 100 |
| α-Chloro-N-t-butyl-N-cyclohexylacetamide | 0.005 | 5.8 | 107 |
| α-Chloro-N-t-butyl-N-cyclohexylacetamide | 0.0005 | 4.7 | 132 |
| α-Chloro-N-ethyl-N-decylacetamide | 0.005 | 5.7 | 109 |
| α-Chloro-N-isopropyl-N-cyclohexenyl | 0.0005 | 5.3 | 117 |
| Control | | 6.5 | 100 |
| α-Chloro-N-(2-methoxyethyl)-N-(2-methyl-1-cyclohexen-1-yl) acetamide | 0.005 | 6.0 | 108 |
| α-Chloro-N-(2-methoxyethyl)-N-(2-methyl-1-cyclohexen-1-yl)acetamide | 0.0005 | 5.7 | 114 |
| α-Chloro-N-allyl-N-(3-methyl-1-cyclohexen-1-yl)acetamide | 0.0005 | .7 | 114 |
| α-Chloro-N-(2,6-dimethyl-1-cyclohexen-1-yl)acetamide | 0.005 | 5.6 | 116 |
| α-Chloro-N-(2-methoxyethyl)-N-(2-isopropyl-1-cyclohexen-1-yl)acetamide | 0.0005 | 5.5 | 118 |
| α-Chloro-N-(2-methoxyethyl)-N-(2-ethyl-1-cyclohexen-1-yl)acetamide | 0.005 | 5.1 | 127 |

EXAMPLE 3

Two groups of sheep were provided the above basal ration for 42 days, self-fed. The ration for one group contained 0.0005% of N-cyclohexyl-α-chloroacetamide. The ration for the other group contained no α-haloacetamide additive and served as control. The average daily weight gain and feed efficiency for each group are set forth in Table III.

TABLE III

| Compound | Average daily gain, kg. | Feed efficiency |
|---|---|---|
| Control | 7.8 | 8.5 |
| N-cyclohexyl-α-chloroacetamide | 8.6 | 7.2 |

EXAMPLE 4

Two groups of heifers were fed the following basal ration for 56 days.

| Component: | Percent |
|---|---|
| Chopped alfalfa (14%) | 37.0 |
| Ground corn | 39.4 |
| Molasses | 8.0 |
| Soybean meal (50%) | 13.0 |
| Dicalcium phosphate | 0.6 |
| Ground limestone | 0.9 |
| Trace minerals | 0.1 |
| Ground corn cobs | 1.0 |

The ration for one group contained 0.002% of N-cyclohexyl-α-chloroacetamide. The ration for the other group contained no α-haloacetamide additive and served as control. The average daily weight gain and feed efficiency for each group are set forth in Table IV.

TABLE IV

| Compound | Average daily gain, lb. | Feed efficiency |
| --- | --- | --- |
| Control | 2.1 | 7.8 |
| N-cyclohexyl-α-chloroacetamide | 2.5 | 6.9 |

The α-haloacetamides useful in this invention are incorporated in animal feed compositions in an effective amount over a wide range of concentrations. Significant animal responses are obtained with feed compositions containing from about 0.0001% by weight to about 0.1% by weight of α-haloacetamide. Preferably, the feed compositions contain from about 0.0005% by weight to about 0.05% by weight of α-haloacetamide.

Based on a fattening lamb consuming about 3 pounds of ration per day and cattle each consuming about 20 pounds of ration per day, the α-haloacetamides are administered to sheep in an amount from about 0.0013 gm. to about 1.3 gm. per head per day, and to cattle in an amount from about 0.009 gm. to about 9.0 gm. per head per day. The α-haloacetamides are preferably administered to sheep in an amount from about 0.007 gm. to about 0.7 gm. per head per day and to cattle in an amount from about 0.045 to about 4.5 gm. per head per day. However, the preferred amount will vary to some extent depending upon the age, weight and environment of the particular species of animal being fed.

The following α-haloacetamides are illustrative of those useful in this invention.

N-methyl-α-chloroacetamide
N-ethyl-α-chloroacetamide
N-n-butyl-α-chloroacetamide
N-dodecyl-α-chloroacetamide
N-octodecyl-α-chloroacetamide
N-allyl-α-chloroacetamide
N-2-propen-1-yl-α-chloroacetamide
N-2-butyn-1-yl-α-chloroacetamide
N-chloromethyl-α-chloroacetamide
N-dichloromethyl-α-chloroacetamide
N-2,2-dibromoethyl-α-chloroacetamide
N-2-hydroxyethyl-α-chloroacetamide
N-2,2-diethoxyethyl-α-chloroacetamide
N-2-aminoethyl-α-chloroacetamide
N-methoxymethyl-α-chloroacetamide
N-butoxymethyl-α-chloroacetamide
N-allyloxymethyl-α-chloroacetamide
N-butoxyethoxyethyl-α-chloroacetamide
N-methyl-α-bromoacetamide
N-propyl-α-bromoacetamide
N-allyloxymethyl-α-bromoacetamide
N-2-chloropropen-1-yl-α-bromoacetamide
N-chloropropargyl-α-bromoacetamide
N-cyclopentyl-α-chloroacetamide
N-cyclohexyl-α-chloroacetamide
N-cyclooctyl-α-chloroacetamide
N-3-methylcyclohexyl-α-chloroacetamide
N-3-t-butylcyclohexyl-α-chloroacetamide
N,N-dimethyl-α-chloroacetamide
N,N-diethyl-α-chloroacetamide
N,N-diallyl-α-chloroacetamide
N,N-dichloromethyl-α-chloroacetamide
N,N-di-2-hydroxyethyl-α-chloroacetamide
N,N-didodecyl-α-chloroacetamide
N,N-di(ethoxymethyl)-α-chloroacetamide
N-methyl-N-cyclohexyl-α-chloroacetamide
N-ethyl-N-n-butyl-α-chloroacetamide
N-n-butyl-N-methoxymethyl-α-chloroacetamide
N-dodecyl-N-allyl-α-chloroacetamide
N-octodecyl-N-chloromethyl-α-chloroacetamide
N-allyl-N-2-hydroxyethyl-α-chloroacetamide
N-2-propen-1-yl-N-methyl-α-chloroacetamide
N-2-butyn-1-yl-N-butoxymethyl-α-chloroacetamide
N-chloromethyl-N-allyl-α-chloroacetamide
N-dichloromethyl-N-cyclopentyl-α-chloroacetamide
N-2,2-dibromomethyl-N-chloromethyl-α-chloroacetamide
N-2-hydroxyethyl-N-ethyl-α-chloroacetamide
N-2-aminoethyl-N-t-butyl-α-chloroacetamide
N-butoxymethyl-N-methyl-α-chloroacetamide
N-allyloxymethyl-N-allyl-α-chloroacetamide
N-butoxyethoxyethyl-N-methyl-α-chloroacetamide
N-methyl-N-allyl-α-bromoacetamide
N-propyl-N-butyl-α-bromoacetamide
N-allyloxymethyl-N-cyclohexyl-α-bromoacetamide
N-2-chloropropen-1-yl-N-ethyl-α-bromoacetamide
N-chloropropargyl-N-methyl-α-bromoacetamide
N-cyclopentyl-N-2-hydroxyethyl-α-chloroacetamide
N-cyclohexyl-N-methyl-α-chloroacetamide
N-cyclooctyl-N-ethyl-α-chloroacetamide
N-3-methylcyclohexyl-N-methyl-α-chloroacetamide
N-2,4-dimethylcyclohexyl-N-methyl-α-chloroacetamide
N-(1-cyclohexen-1yl) N-(isopropyl) α-chloroacetamide
N-(2-cyclohexen-1-yl) N-(ethoxyethyl) α-chloroacetamide
N-(1-cyclohexen-1-yl) N-(methoxyethyl) α-chloroacetamide
N-(1-cyclopenten-1-yl) N-(ethoxyethyl) α,α-dibromoacetamide
N-(3-methyl-2-cyclohexen-1-yl) N-(isopropyl) α-bromoacetamide
N-(1-cyclohexen-1-yl) N-(cycloheptyl) α-chloroacetamide
N-(1-cyclohexen-1-yl) N-(propynyl) α-chloroacetamide
N-(2-cyclohexen-1-yl) N-(methyl) α-chloroacetamide
N-(1-cyclohexen-1-yl) N-(2,2-diethoxyethyl) α-chloroacetamide
N-(1-cyclohexen-1-yl) N-(methoxybutyl) α-iodoacetamide
N-(2-cyclohexen-1-yl) N-(2-buten-1-yl) α-chloroacetamide
N-(1-cyclopenten-1-yl) N-(n-butyl) α-chloroacetamide
N-(2-cyclopenten-1-yl) N-(2-propen-1-yl) α-chloroacetamide
N-(1-cyclohepten-1-yl) N-(isopropyl) α-chloroacetamide
N-(1,3-cyclohexadien-1-yl) N-(allyl) α-chloroacetamide
N-(3-methyl-1-cyclopenten-1-yl) N-(methyl) α-bromoacetamide
N-(3,4-dimethyl-1-cyclopenten-1-yl) N-(decyl) α,α,α-trichloroacetamide
N-(3,4-dimethoxy-5-cyclopenten-1-yl) N-(isopropyl) α-chloroacetamide
N-[5-(tert-butyl)-1-cyclopenten-1-yl] N-(isopropyl) α-chloroacetamide
N-(3-methyl-5-cyclopenten-1-yl) N-methyl α-chloroacetamide
N-(3,4-dimethyl-1-cyclohexen-1-yl) N-(cyclohexyl) α-chloroacetamide
N-(5-methyl-1-cyclohexen-1-yl) N-(n-butyl) α-bromoacetamide
N-(3,4-dimethyl-6-cyclohexen-1-yl) N(allyl) α-chloroacetamide
N-(2,4-dimethyl-1-cyclohexen-1-yl) N-(chloromethyl) α-chloroacetamide
N-(2,4,6-trimethyl-2-cyclohexen-1-yl) N-(2-hydroxyethyl) α-chloroacetamide
N-(2,6-diethyl-6-cyclohexen-1-yl) N-(2-propen-1-yl) α-chloroacetamide
N-[2,6-di(tert-butyl)-1-cyclohexen-1-yl] N-(allyloxybutyl) α-chloroacetamide
N-(3-methyl-6-cyclohexen-1-yl) N-methyl α-chloroacetamide
N-(6-methyl-1,3-cyclohexadien-1-yl) N-(methoxymethyl) α-bromoacetamide
N-(5-methyl-4,6-cyclohexadien-1-yl) N-(methoxybutoxymethyl) α-chloroacetamide
N-(3-methoxy-4,6-cyclohexadien-1-yl) N-(chloromethyl) α-chloroacetamide N-(3,5-n-butyl-1,3-cyclohexadien-1-yl) N-(allyl) α-chloroacetamide
N-[2,6-di(tert-butyl)-1,3-cyclohexadien-1-yl]-N-methyl α-chloroacetamide
N-(2-methyl-3-chloro-1,3-cyclohexadien-1-yl)-N-butyl α-chloroacetamide
N-(4-methyl-1,3-cyclohexadien-1-yl)-N-decyl α,α-dibromoacetamide
N-(3,5-dimethoxy-1,4-cyclohexadien-1-yl)-N-methoxymethyl α-chloroacetamide
N-(2,6-dimethyl-1,4-cyclohexadien-1-yl)-N-butoxymethyl α-chloroacetamide
N-(3,3-dimethyl-1,4-cyclohexadien-1-yl)-N-allyl α-chloroacetamide
N-(6-tert-butyl-1,4-cyclohexadien-1-yl)-N-2-buten-1-yl α-chloroacetamide
N-(4-isopropyl-1,4-cyclohexadien-1-yl)-N-bromomethyl α-chloroacetamide
N-(4-methyl-1,4-cyclohexadien-1-yl)-N-2-hydroxyethyl α,α-dichloroacetamide
N-(3-methyl-2,6-cyclohexadien-1-yl)-N-butenyloxymethyl α,α,α-trichloroacetamide
N-(3,5-di-n-butyl-2,6-cyclohexadien-1-yl)-N-3-penten-1-yl α-chloroacetamide
N-(4,4-dimethyl-2,6-cyclohexadien-1-yl)-N-dodecyl α-chloroacetamide
N-(6-tert-butyl-2,6-cyclohexadien-1-yl)-N-(2,4-dihydroxybutyl) α-chloroacetamide
N-(2,6-dimethoxy-2,6-cyclohexadien-1-yl)-N-methyl α-chloroacetamide
N-(2,4-dimethyl-2,6-cyclohexadien-1-yl)-N-2-bromoethyl α-chloroacetamide
N-(3-methyl-4-methoxy-1,5-cyclohexadien-1-yl)-N-allyloxyethoxyethyl α-chloroacetamide
N-(3,4-dimethyl-1,5-cyclohexadien-1-yl)-N-cyclopentyl α-chloroacetamide
N-(5-methyl-1,5-cyclohexadien-1-yl)-N-3-methylcyclohexyl α-chloroacetamide
N-(4-methyl-1,5-cyclohexadien-1-yl)-N-cyclooctyl α-chloroacetamide
N-(2,6-dimethyl-1,5-cyclohexadien-1-yl)-N-3-methylcyclohexyl α-chloroacetamide
N-(2,4,4-trimethyl-1,5-cyclohexadien-1-yl)-N-4,4-dimethoxybutyl α-chloroacetamide
N-(6-tetrt-butyl-1,5-cyclohexadien-1-yl)-N-methyl α-bromoacetamide
N-(3-methyl-3,6-cyclohexadien-1-yl)-N-butoxymethyl α-chloroacetamide
N-(2-n-butyl-3,6-cyclohexadien-1-yl)-N-allayloxybutoxymethyl α-chloroacetamide
N-(2,5-dimethoxy-3,6-cyclohexadien-1-yl)-N-methyl α-bromoacetamide
N-(6-tert-butyl-3,6-cyclohexadien-1-yl)-N-isopropyl α-chloroacetamide
N-(3,6-dimethyl-3,6-cyclohexadien-1-yl)-N-chloromethyl α-chloroacetamide
N-(3-methyl-4-methoxy-1-cyclohepten-1-yl) N-(isopropyl) α-chloroacetamide
N-(3,4-dimethyl-1-cyclohepten-1-yl) N-(n-butyl) α,α,α-tribromoacetamide
N-(7-tert-butyl-1-cyclohepten-1-yl) N-(2-hydroxyethyl) α-chloroacetamide
N-(3,4-diisopropyl-1-cyclohepten-1-yl) N-(isopropyl) α-chloroacetamide
N-(6-methyl-7-cyclohepten-1-yl) N-(methoxybutyl) α-chloroacetamide
N-(3,5-diethoxy-1-cyclohepten-1-yl) N-(methyl α-chloroacetamide The oral administration of α-haloacetamides in accordance with this invention can be accomplished in the form of tablets, capsules, powders, solutions, suspensions or in admixture with one or more components of the animal's diet. Alternatively, the α-haloacetamides can be administered in an equivalent amount in the animal's drinking water.

Conventional ruminant feed rations generally comprise at least about 2 percent plant ingredients such as hay, straw, silage, yellow corn, pasturage, ground corn cobs, cottonseed hulls, cotton mill wastes, beet pulp, corn meal, soybean meal, wheat bran, wheat middlings, dehydrated alfalfa, ground oats, millet, linseed meal, coconut meal, distillers, dried grains, peanut meal, cottonseed meal and the like plant products. Most ruminant feed rations also contain up to about 2 percent mineral ingredients such as bone meal, limestone, salt (NaCl) and the various trace minerals including salts of zinc, copper, manganese, cobalt, iodine, iron and the like. Other materials which can be incorporated into ruminant feed rations in varying amounts include animal ingredients such as fish meal, meat and bone scraps, dried milk, animal fats, dried whey solubles and the like; vitaminaceous ingredients such as vitamins A, $B_{12}$, D and K, as well as the B vitamins such as riboflavin, niacin, pantothenic acid or salts thereof, choline, pyridoxine, thiamine, nicotinic acid or salts thereof, biotin, folic acid and the like; amino acids such as methionine, phenylalanine, arginine, glycine, histidine, isoleucine, leucine, lysine, threonine, tryptophan, valine and the like; medicaments such as antibiotics, steroids, arsenicals, anthelmintics and the like, and antioxidants, for example, 6 - ethoxy - 2,2,4 - trimethyl - 1,2 - dihydroquinoline, butylated hydroxy anisol, butylated hydroxy toluene, 4,4 - bis(2,6 - di - t - butyl phenol), gamma-tocopherol, esters of gallic acid, and the like.

The feed compositions of this invention can be prepared by incorporating the α-haloacetamides in various ways into any or all components of conventional diets for the type of animal in question. The α-haloacetamides can be added to the diet rations as the pure compounds, as a stabilized concentrate wherein the α-haloacetamide is coated with a protective material such as gelatine or gelatine and sugar, as an adsorbate on silica gel, oatmeal, soybean meal, ion-exchange resins, as a simple admixture with a diluent such as cereal meal, and oil meal and stabilizers, or in solution or emulsion in a vegetable oil such as peanut oil, soybean oil, sesame oil and the like and preferably including a stabilizer. An oil solution or emulsion lends itself to spraying on the basal ration. Alternatively, the α-haloacetamides can be mixed with other feed additives such as vitamins, antibiotics, minerals and other materials of this nature in a feed supplement which is supplied to grain mills or to feed manufacturers who then incorporate it into the finished diet to be supplied to the animals by the farmer. Blending of such materials can be accomplished in the usual type apparatus used for the preparation of dry feed products. For young animals the α-haloacetamides can be incorporated into liquid or semiliquid feeds or mashes in the form of a suspension or dispersion of the active material. An emulsion or dispersion in peanut oil, soybean oil, and the like can be prepared and these are particularly adapted for liquid compositions including drinking water. The α-haloacetamides can be administered alone to the animals but it is more convenient and effective to use the active material in the animals' feed composition.

The growth promoting compounds of this invention are also useful for the improvement of carcass quality in cattle as manifested by increased marbling when employed in animal feeds at the concentration stated above.

Although the invention is described with respect to specific modifications, the details thereof are not to be construed as limitations.

The embodiments of the invention in which an exclusive property or privilege is claimed are defined as follows:

1. A method of improving the growth response in an animal selected from the group consisting of poultry, swine and ruminants which comprises feeding said animal a composition comprising an animal feed and from about 0.0001% to about 0.1% by weight of the composition of a compound of the formula

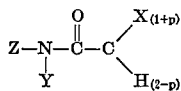

wherein

X is halogen; $p$ is an integer from 0 to 2 inclusive;
Z is selected from the group consisting of
- (I) hydrogen,
- (II) $X_n{}^1R$— wherein R is hydrocarbyl of not more than 18 carbon atoms selected from the group consisting of alkyl, alkenyl and alkynyl, $X^1$ is halogen, hydroxyl or amino and $n$ is an integer from 0 to 3 inclusive,
- (III) cycloalkyl, alkylcycloalkyl and alkoxycycloalkyl of at least 5 and not more than 8 ring carbon atoms and not more than 12 chain carbon atoms, and
- (IV) $R^3O\{R^2O\}_aR^1$— wherein $R^1$ is selected from the group consisting of alkylene and alkoxyalkylene of not more than 8 carbon atoms, $R^2$ is alkylene of not more than 4 carbon atoms, $R^3$ is selected from the group consisting of alkyl and alkenyl of not more than 4 carbon atoms and $a$ is an integer from 0 to 1; and Y is selected from the group consisting of
- (V) hydrogen,
- (VI) $X_m{}^2R^4$— wherein $R^4$ is hydrocarbyl of not more than 18 carbon atoms selected from the group consisting of alkyl, alkenyl and alkynyl, $X^2$ is halogen, hydroxyl or amino and $m$ is an integer from 0 to 3 inclusive,
- (VII) $R^7O\{R^6O\}_bR^5$— wherein $R^5$ is selected from the group consisting of alkylene and alkoxyalkylene of not more than 8 carbon atoms, $R^6$ is alkylene of not more than 4 carbon atoms, $R^7$ is selected from the group consisting of alkyl and alkenyl of not more than 4 carbon atoms and $b$ is an integer from 0 to 1, and
- (VIII) cycloalkenyl, alkylcycloalkenyl and alkoxycycloalkenyl of at least 5 and not more than 8 ring carbon atoms, and not more than 12 chain carbon atoms.

2. Method of claim 1 wherein the animal is a ruminant.

3. Method of claim 2 wherein $p$ is 0, Y is hydrogen and Z is represented by II.

4. Method of claim 3 wherein $n$ is 0 and R is alkyl.

5. Method of claim 2 wherein $p$ is 0, Y is hydrogen and Z is represented by III.

6. Method of claim 5 wherein III is cycloalkyl.

7. Method of claim 2 wherein $p$ is 0, Y is hydrogen and Z is represented by IV.

8. Method of claim 7 wherein IV is alkoxyalkyl.

9. Method of claim 2 wherein $p$ is 0, Z is represented by II and Y is represented by VI.

10. Method of claim 2 wherein $p$ is 0, Z is represented by IV and Y is represented by VII.

11. Method of claim 2 wherein $p$ is 0, Z is represented by IV and Y is represented by VIII.

12. Method of claim 11 wherein IV is alkoxyalkyl and VIII is cyclohexenyl.

13. Method of claim 2 wherein the compound is N-cyclohexyl-$\alpha$-chloroacetamide.

14. Method of claim 2 wherein the compound is N-methyl-$\alpha$-chloroacetamide.

15. Method of claim 2 wherein the compound is N-ethyl-$\alpha$-chloroacetamide.

16. Method of claim 2 wherein the compound is N-t-butyl-$\alpha$-chloroacetamide.

17. Method of claim 2 wherein the compound is N-allyl-$\alpha$-chloroacetamide.

References Cited

UNITED STATES PATENTS

| | | | |
|---|---|---|---|
| 2,718,467 | 9/1955 | Belasco et al. | 99—2 |
| 3,244,747 | 4/1966 | Ratts | 260—561 |
| 3,268,324 | 8/1966 | Hamm et al. | 260—561 |
| 3,287,106 | 11/1966 | Chupp | 260—561 |
| 3,314,849 | 4/1967 | Hamm | 424—320 |

OTHER REFERENCES

The Merck Veterinary Manual, Merck & Co., Inc., Rahway, N.J. (1955, pp. 788–789).

STANLEY J. FRIEDMAN, Primary Examiner
F. E. WADDELL, Assistant Examiner

U.S. Cl. X.R.
424—341, 342